Sept. 13, 1932.   H. HUEBER ET AL   1,877,321
WIPER ARM MOUNTING FOR WINDSHIELD CLEANERS
Filed Jan. 30, 1929
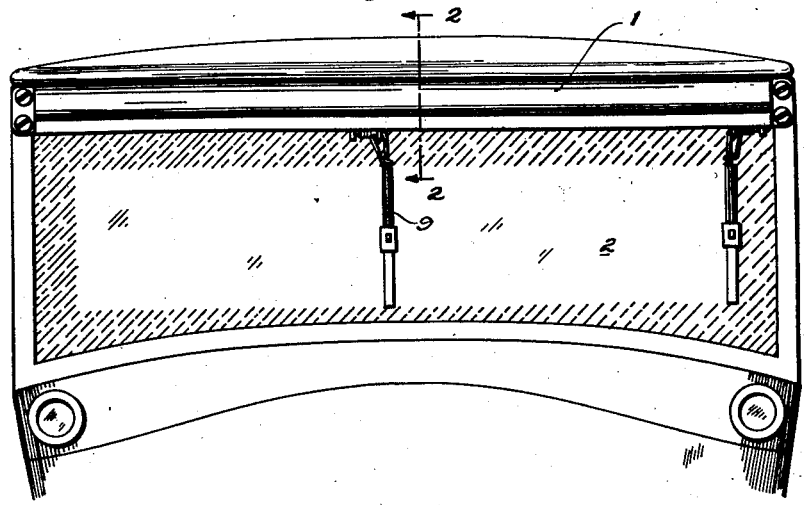
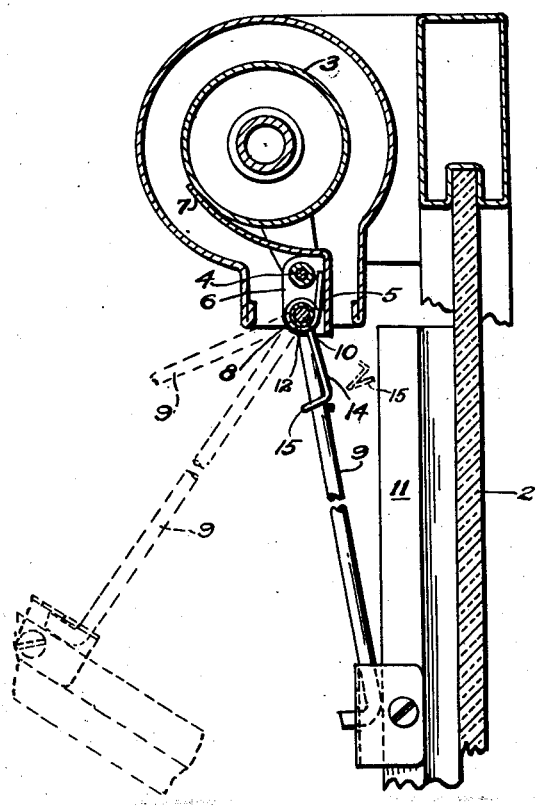
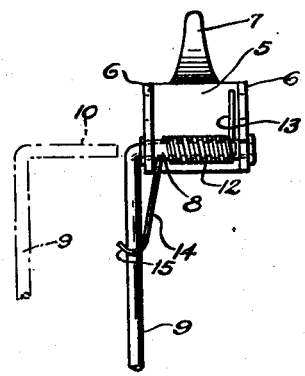
Inventors
Henry Hueber
Erwin C. Horton
by Barton A. Bean
Attorney Patented Sept. 13, 1932

1,877,321

UNITED STATES PATENT OFFICE

HENRY HUEBER, OF BUFFALO, AND ERWIN C. HORTON, OF HAMBURG, NEW YORK, ASSIGNORS TO TRICO PRODUCTS CORPORATION, OF BUFFALO, NEW YORK

WIPER ARM MOUNTING FOR WINDSHIELD CLEANERS

Application filed January 30, 1929. Serial No. 336,245.

This invention relates to windshield cleaners and more particularly to the mounting of the wiper carrying arm. Especially does this invention relate to that type of cleaner set forth in Patent No. 1,697,358 issued to Henry Hueber January 1, 1929, wherein a readily demountable wiper arm is most desirable.

The heretofore employed mounting for wiper arms in the straight reciprocatory cleaner has necessitated the use of tools for attachment or replacement, and the incorporated means for affording the desired wiping pressure has not been of a simple and satisfactory make-up. As a rule windshield cleaners are mounted beneath overhanging visors in almost inaccessible positions thereby making it exceedingly difficult to use tools for the attachment and replacement of wiper arms.

The primary aim and object of this invention is to improve and simplify the arm mounting to a satisfactory and commercially practical extent.

A further object is to provide a wiper mounting for cleaners of this type in which the wiper arm is easily removable and accessible for removal. Practically the only parts on a windshield cleaner assembly requiring replacement are the wiper and its arm and it is therefore desirable that the cleaner arm be of a design either easily removable or easily adjustable for the removal of the squeegee or wiper both of which features are included in this invention. Previous efforts on this type of cleaner have disclosed wipers removable only after removal of bolts etc. which practice has been found impractical due to rusting of the bolts, time required for removal, and the usual inaccessibility of the cleaner.

A still further object is to provide a less expensive wiper due to simplicity of design thus rendering replacement costs practically negligible.

Still further, the invention resides in a simplified mounting in which the arm is retained against accidental displacement by the pressure-producing element of the mounting, and also in the salient features of construction and the arrangements and combinations of parts hereinafter described and claimed, reference being made to the accompanying drawing wherein, Fig. 1 is a fragmentary front elevation of a motor vehicle, provided with a horizontal type of windshield cleaner embodying the present invention.

Fig. 2 is a cross section therethrough on line 2—2 of Fig. 1.

Fig. 3 is a front view of a wiper as applied to a fitting on the cleaner.

Referring more in detail to the drawing, the numeral 1 indicates a windshield cleaner mounted for use on a windshield 2. This cleaner is depicted as being of that type illustrated in Patent No. 1,697,358 granted to Henry Hueber January 1, 1929, the same comprising an actuator or driven member embodying a reciprocatory cylinder 3 carrying a wiper support 4 on which are mounted spaced carriers 5. Each of the driven parts or carriers 5 is preferably formed of sheet metal and consists of a body portion having opposed marginal ears or flanges 6, through which the support 4 extends, and a pressure finger 7 lapping over the periphery of the cylinder 3. Supported by the ears 6 is a bushing 8 which extends through the said ears and has its opposite ends headed over the outer faces of the ears to prevent horizontal displacement thereof. This bushing forms the mounting for the wiper carrying arm 9 which has its upper end extended laterally to form a pivot 10 for receiving pivotal support in the bushing 8 as a bearing. The lower or free end of the arm supports a squeegee member 11, which in the preferred showing is of a readily removable type but which may be otherwise secured to the arm 9. The wiper arm and squeegee assembly is maintained in working contact against the windshield by a torsion spring 12 which is disposed about the bushing 8 and has one end 13 bearing on the body portion of its carrier 5 and its opposite end 14 extended downwardly and terminating in a hook portion 15 for engaging about the wiper arm 9. The hook portion 15 is offset to provide an arm receiving seat extending substantially transversely to the axis of the arm and opening toward the windshield glass. The single resilient member therefore performs a dual function, first, in providing the desired pressure for the wiping contact and, second, in maintaining the said arm against lateral and unauthorized displacement from its bearing 8. This construction forms a detachable spring hinge mounting whereby the arm 9 may be swung outwardly and away from the windshield glass to permit replacement of the squeegee, as shown in dotted lines in Fig. 2, or the arm may be displaced from its bearing by first disengaging the hook portion 15 from the wiper arm and then shifting the arm axially of the bushing 8. This will allow of easy replacement of a wiper assembly on the cleaner or of the easy replacement of the squeegee.

When the assembly is operative, as depicted in the full line showing of Fig. 2, the pressure finger 7 is urged against the cylinder 3 and thereby serves its office in preventing excessive pivoting of the carrier about the support 4. Furthermore, the pressure finger affords additional resistance to any influence tending to slide the carrier on its support.

What is claimed is:

1. In a windshield cleaner, an actuator, and wiper-mounting means carried thereby and comprising a carrier body having spaced ears provided with apertures, a bushing mounted in the apertures of said ears, a cleaner arm having a lateral extension removably journalled in said bushing to permit said arm to swing to and from the windshield, and a torsion spring anchored with respect to the carrier body, said spring being disposed about said bushing and having an arm interlockingly and removably engaging said cleaner arm, and acting to both secure the cleaner arm against displacement from said bearing and maintain said cleaner arm in an operative position with the windshield.

2. In a windshield cleaner, an actuator provided with a horizontally mounted bushing, a cleaner arm having a lateral pivot removably journalled in said bushing, and a torsion spring anchored with respect to the actuator; said spring being disposed about said bushing and releasably connected with said cleaner arm to allow removal thereof from the said bushing, said spring maintaining said cleaner arm in an operative position on the windshield.

3. In a windshield cleaner provided with a reciprocating drive cylinder, wiper-mounting means comprising a carrier having spaced ears provided with apertures, a bushing securely mounted in said apertures of said ears, and a pressure finger frictionally engaging said drive cylnder; a cleaner arm having a lateral pivot displaceably journalled in said bushing to permit said arm to swing to and from the windshield, and a tension spring anchored with respect to the carrier, said spring being disposed about said bushing and having an arm interlockingly engaging said cleaner arm and acting to both secure the cleaner arm against displacement from said bushing and to frictionally maintain said cleaner arm and pressure finger in operative positions.

4. In a windshield cleaner, a carrier having spaced co-axial bearings, a one-piece wiper arm comprising a pintle and an arm portion substantially at right angles to the pintle, said pintle being journalled in the bearings for pivotal action, a spring coiled about the axis of the pintle and disposed between said bearings, one end of the spring bearing on the carrier and the opposite end extending away from the carrier and being bent to form a substantially U-shaped seat extending transversely of the arm portion for receiving a portion of the arm occurring between the pintle and the wiper carrying end of the arm, whereby the spring by contact of the U-shaped part with the arm will urge relative movement between the arm and carrier about the axis of the pintle, and whereby the U-shaped part of the spring will, by engaging the arm, restrain accidental axial movement of the pintle in the bearings.

HENRY HUEBER.
ERWIN C. HORTON.